(12) United States Patent
Lee et al.

(10) Patent No.: US 10,957,277 B2
(45) Date of Patent: Mar. 23, 2021

(54) POWER VOLTAGE GENERATING CIRCUIT AND DISPLAY APPARATUS HAVING THE SAME AND METHOD OF PROTECTING DATA DRIVER USING THE SAME

(71) Applicant: Samsung Display Co., Ltd., Yongin-si (KR)

(72) Inventors: Dae-Sik Lee, Hwaseong-si (KR); Yanguk Nam, Hwaseong-si (KR); Songyi Han, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/376,922

(22) Filed: Apr. 5, 2019

(65) Prior Publication Data

US 2019/0318705 A1 Oct. 17, 2019

(30) Foreign Application Priority Data

Apr. 11, 2018 (KR) ........................ 10-2018-0042159

(51) Int. Cl.
*G09G 5/00* (2006.01)

(52) U.S. Cl.
CPC ..... *G09G 5/003* (2013.01); *G09G 2310/0267* (2013.01); *G09G 2310/0275* (2013.01); *G09G 2310/0289* (2013.01); *G09G 2320/0219* (2013.01); *G09G 2330/028* (2013.01);
(Continued)

(58) Field of Classification Search
CPC ... G09G 2310/0267; G09G 2310/0275; G09G 2310/0289; G09G 2310/08; G09G 2320/0219; G09G 2330/00; G09G 2330/028; G09G 2330/04; G09G 2330/08;
(Continued)

(56) References Cited

U.S. PATENT DOCUMENTS

| 2008/0018634 A1* | 1/2008 | Yeo | G09G 3/3696 345/210 |
| 2009/0303403 A1* | 12/2009 | Park | G09G 3/3696 349/33 |

(Continued)

FOREIGN PATENT DOCUMENTS

| KR | 10-0624087 B1 | 9/2006 |
| KR | 10-2013-0049049 A | 5/2013 |
| KR | 10-1871906 B1 | 6/2018 |

*Primary Examiner* — Hong Zhou
(74) *Attorney, Agent, or Firm* — Lewis Roca Rothgerber Christie LLP

(57) ABSTRACT

A power voltage generating circuit includes an input capacitor including a first end connected to an input node, and a second end connected to a ground, an inductor, an input switching element connected between the input node and a first end of the inductor, a control switching element including a control electrode connected to a switching controller configured to apply a switching control signal, an input electrode connected to a resistor, and an output electrode connected to a second end of the inductor, a diode including a first electrode connected to the second end of the inductor, and a second electrode connected to an output node, and an output capacitor connected between the output node and the ground, wherein the input switching element is configured to be turned off when a short circuit of a load connected to the output node is detected in a monitoring period.

12 Claims, 12 Drawing Sheets

(52) U.S. Cl.
CPC ..... *G09G 2330/04* (2013.01); *G09G 2330/08* (2013.01); *G09G 2330/12* (2013.01)

(58) Field of Classification Search
CPC .... G09G 2330/12; G09G 3/20; G09G 3/3696; G09G 5/003
See application file for complete search history.

(56) References Cited

U.S. PATENT DOCUMENTS

| | | | | |
|---|---|---|---|---|
| 2010/0128022 | A1* | 5/2010 | Takada | H02M 3/07 345/213 |
| 2012/0019569 | A1* | 1/2012 | Byun | G09G 3/3233 345/690 |
| 2013/0113773 | A1* | 5/2013 | Lee | H05B 45/37 345/211 |
| 2013/0328854 | A1* | 12/2013 | Ruan | G09G 3/3696 345/212 |
| 2014/0084792 | A1* | 3/2014 | Oh | G09G 3/00 315/120 |
| 2015/0116302 | A1* | 4/2015 | Kim | G09G 3/3225 345/212 |
| 2016/0155374 | A1* | 6/2016 | Lee | G09G 3/3696 345/212 |
| 2017/0221440 | A1* | 8/2017 | Chen | G09G 3/3677 |

\* cited by examiner

FIG. 7

| dt[ms] | 1 |
|---|---|
| C[uF] | 40 |
| ic[mA] | dv[V] |
| 10 | 0.25 |
| 20 | 0.5 |
| 50 | 1.25 |
| 100 | 2.5 |
| 200 | 5 |
| 300 | 7.5 |

POWER VOLTAGE GENERATING CIRCUIT AND DISPLAY APPARATUS HAVING THE SAME AND METHOD OF PROTECTING DATA DRIVER USING THE SAME

CROSS-REFERENCE TO RELATED APPLICATION

This application claims priority to, and the benefit of, Korean Patent Application No. 10-2018-0042159, filed on Apr. 11, 2018 in the Korean Intellectual Property Office KIPO, the contents of which are herein incorporated by reference in their entireties.

BACKGROUND

1. Field

Embodiments of the present inventive concept relate to a power voltage generating circuit for sensing a weak signal of a short circuit of a load, a display apparatus including the power voltage generating circuit, and a method of protecting a data driver using the power voltage generating circuit.

2. Description of the Related Art

A display apparatus includes a display panel, a display panel driver for driving the display panel, and a power voltage generator for providing a power voltage to the display panel driver.

The display panel includes a plurality of gate lines, a plurality of data lines, and a plurality of pixels. The display panel driver includes a gate driver and a data driver. The gate driver outputs gate signals to the gate lines. The data driver outputs data voltages to the data lines.

When a short circuit is generated in the display panel driver or in the display panel, the power voltage generator may stop providing the power voltage to the display panel driver to protect the display panel driver from damage. However, when a weak signal of the short circuit of the display panel driver or the display panel is not sensed, the power voltage generator may continue providing the power voltage to the display panel driver, and the display panel driver or the display panel may be damaged as a result.

SUMMARY

Embodiments of the present inventive concept provide a power voltage generating circuit capable of sensing a weak signal of a short circuit of a load. Embodiments of the present inventive concept also provide a display apparatus including the above-mentioned power voltage generating circuit. Embodiments of the present inventive concept also provide a method of protecting a data driver using the abovementioned power voltage generating circuit.

In an embodiment of a power voltage generating circuit according to the present inventive concept, the power voltage generating circuit includes an input capacitor including a first end connected to an input node, and a second end connected to a ground, an inductor, an input switching element connected between the input node and a first end of the inductor, a control switching element including a control electrode connected to a switching controller configured to apply a switching control signal, an input electrode connected to a resistor, and an output electrode connected to a second end of the inductor, a diode including a first electrode connected to the second end of the inductor, and a second electrode connected to an output node, and an output capacitor connected between the output node and the ground, wherein the input switching element is configured to be turned off when a short circuit of a load connected to the output node is detected in a monitoring period.

The input switching element may be configured to be turned off when the control switching element is turned off and voltage drop of an output voltage, which is measured in the monitoring period, is equal to or greater than a reference voltage drop.

The switching controller may be configured to receive a feedback output voltage of the output node, and may be configured to adjust a frequency of the switching control signal to adjust a level of the output voltage according to the feedback output voltage.

The switching controller may be configured to count a number of events in which a current sensing voltage of the input electrode of the control switching element is equal to or greater than a threshold voltage during the monitoring period, wherein the input switching element is configured to be turned off when the number of events is equal to or greater than a reference count.

In an embodiment of a display apparatus according to the present inventive concept, the display apparatus includes a display panel configured to display an image, a gate driver configured to output a gate signal to the display panel, a data driver configured to output a data voltage to the display panel, and a power voltage generator configured to provide a gate driver power voltage to the gate driver, configured to provide a data driver power voltage to the data driver, and including a data driver power voltage generator that is configured to generate the data driver power voltage, the data driver power voltage generator including an input capacitor including a first end connected to an input node and a second end connected to a ground, an inductor, an input switching element connected between the input node and a first end of the inductor, a control switching element including a control electrode connected to a switching controller that is configured to apply a switching control signal, an input electrode connected to a resistor, and an output electrode connected to a second end of the inductor, a diode including a first electrode connected to the second end of the inductor, and a second electrode connected to an output node, and an output capacitor connected between the output node and the ground, wherein the data driver power voltage generator is configured to turn off the input switching element when a short circuit of a load connected to the output node is detected in a monitoring period.

The control switching element may be configured to be turned off, and voltage drop of the data driver power voltage outputted from the output node may be configured to be measured, in the monitoring period, wherein the input switching element is configured to be turned off when the voltage drop of the data driver power voltage is equal to or greater than a reference voltage drop.

The monitoring period may be between a time when the data driver power voltage meets a normal output voltage and a scan start point of the gate driver in an initial driving period of the display apparatus.

The display panel may be configured to display the image in units of frames, wherein each of the frames includes an active period and a vertical blank period, and wherein the monitoring period is in the vertical blank period.

A hold period may occur before the monitoring period, wherein the control switching element is configured to repetitively turn on and off during the hold period, and wherein the hold period is in the vertical blank period.

The data driver may be configured to output a black data voltage corresponding to a black image to the display panel during the monitoring period.

The switching controller may be configured to receive a feedback data driver power voltage of the output node, and is configured to adjust a frequency of the switching control signal to adjust a level of the data driver power voltage according to the feedback data driver power voltage.

The switching controller may be configured to count a number of events in which a current sensing voltage of the input electrode of the control switching element is equal to or greater than a threshold voltage during the monitoring period, wherein the input switching element is configured to be turned off when the number of events is equal to or greater than a reference count.

The monitoring period may be between a time when the data driver power voltage meets a normal output voltage and a scan start point of the gate driver in an initial driving period of the display apparatus.

The display panel may be configured to display the image in units of frames, wherein each of the frames includes an active period and a vertical blank period, and wherein the monitoring period is set in the vertical blank period.

A hold period may occur before the monitoring period, wherein the switching controller does not count the number of events during the hold period, and wherein the hold period is in the vertical blank period.

Respective monitoring periods may be respectively set in a plurality of frames, wherein the switching controller is configured to count the number of events during the monitoring period in a single frame of the frames, wherein each of the frames is determined as an abnormal frame when the number of events is equal to or greater than the reference count, and wherein the input switching element is configured to be turned off when a number of abnormal frames is equal to or greater than a reference number of frames.

In an embodiment of a method of protecting a data driver according to the present inventive concept, the method includes generating a gate driver power voltage, outputting the gate driver power voltage to a gate driver, generating a data driver power voltage, outputting the data driver power voltage to the data driver, outputting a gate signal to a display panel based on the gate driver power voltage, outputting a data voltage to the display panel based on the data driver power voltage, turning off a control switching element and measuring a voltage drop of the data driver power voltage outputted from an output node in a monitoring period, and turning off an input switching element when the voltage drop of the data driver power voltage is equal to or greater than a reference voltage drop.

The monitoring period may be between a time when the data driver power voltage meets a normal output voltage and a scan start point of the gate driver in an initial driving period of a display apparatus.

The display panel may be configured to display an image in units of frames, each of the frames including an active period and a vertical blank period, wherein the monitoring period is set in the vertical blank period.

The data driver may be configured to output a black data voltage corresponding to a black image to the display panel during the monitoring period.

According to the power voltage generating circuit, the display apparatus including the power voltage generating circuit, and the method of protecting the data driver using the power voltage generating circuit of describe embodiments, a control switching element of the power voltage generating circuit is turned off to sense a voltage drop of the output voltage in a monitoring period, or a signal of the control switching element of the power voltage generating circuit is sensed in the monitoring period so that a weak signal of the short circuit of the load may be sensed.

In addition, the weak signal of the short circuit of the load may be sensed without affecting the display quality of the display panel.

Accordingly, the weak signal of the short circuit of the load may be sensed so that the display panel driver and the display panel may be protected from damage, and an accident of the product, such as fire, may be avoided.

BRIEF DESCRIPTION OF THE DRAWINGS

The above and other aspects of the present inventive concept will become more apparent by describing detailed embodiments thereof with reference to the accompanying drawings, in which:

FIG. 7 is a table illustrating a voltage drop of a data driver power voltage according to a current of the load of FIG. 5;

DETAILED DESCRIPTION

Figure 1:
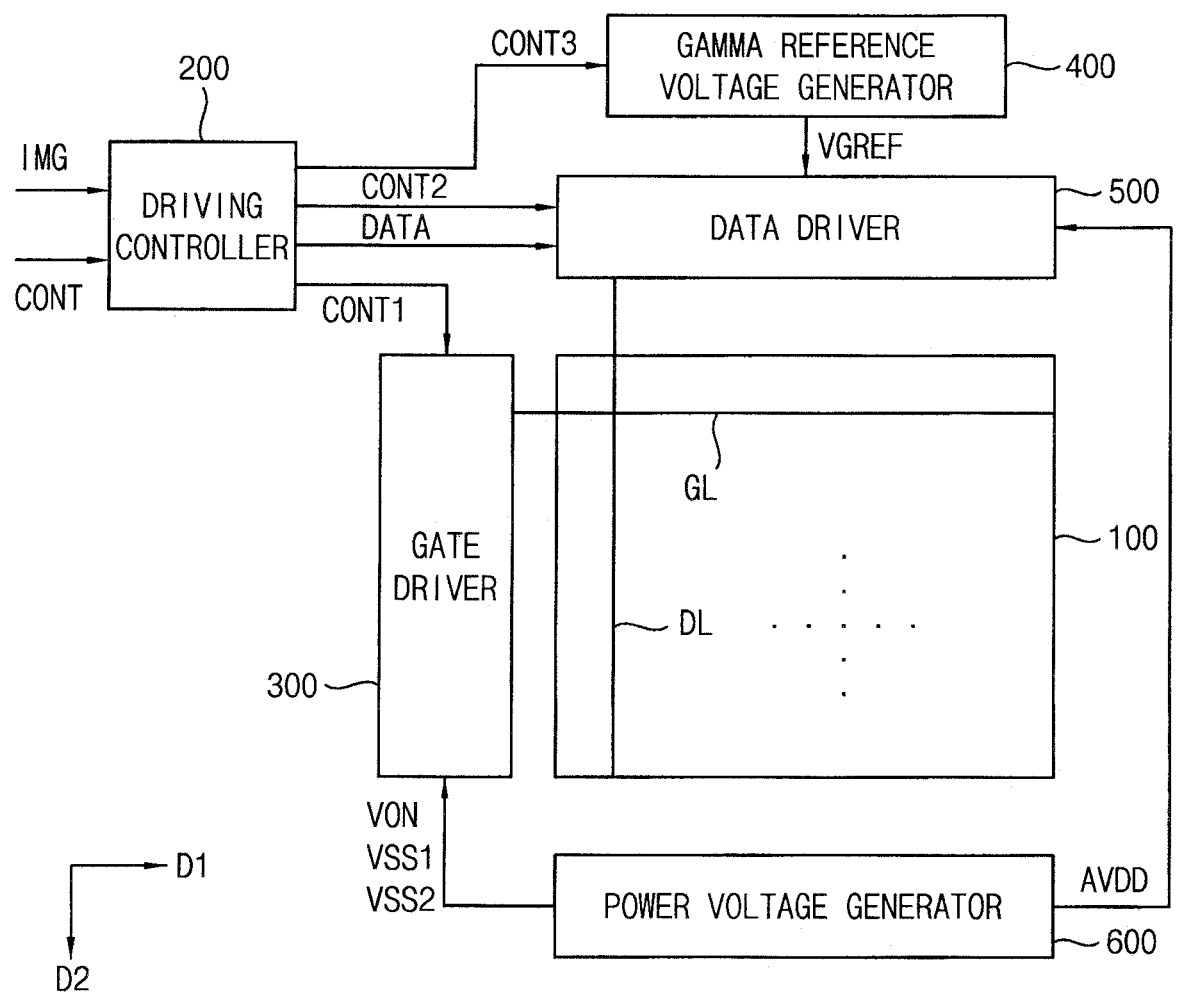
FIG. 1 is a block diagram illustrating a display apparatus according to an embodiment of the present inventive concept.

Features of the inventive concept and methods of accomplishing the same may be understood more readily by reference to the following detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present invention.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." As used herein, the terms "use," "using," and "used" may be considered synonymous with the terms "utilize," "utilizing,"

and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display apparatus according to an embodiment of the present inventive concept.

Referring to FIG. 1, the display apparatus includes a display panel 100 and a display panel driver. The display panel driver includes a driving controller 200, a gate driver 300, a gamma reference voltage generator 400, a data driver 500, and a power voltage generator 600.

The display panel 100 includes a display region, and a peripheral region adjacent to the display region.

The display panel 100 includes a plurality of gate lines GL, a plurality of data lines DL, and a plurality of pixels electrically connected to the gate lines GL and the data lines DL. The gate lines GL extend in a first direction D1, and the data lines DL extend in a second direction D2 crossing the first direction D1.

The driving controller 200 receives input image data IMG and an input control signal CONT (e.g., from an external apparatus). The input image data IMG may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals for driving the gate lines GL in response to the first control signal CONT1 received from the driving controller 200. The gate driver 300 may sequentially output the gate signals to the gate lines GL.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be located in the driving controller 200 or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The power voltage generator 600 generates gate driver power voltages VON, VSS1, and VSS2 to operate the gate driver 300, and the power voltage generator 600 outputs the gate driver power voltages VON, VSS1, and VSS2 to the gate driver 300. The gate driver power voltage may include a gate on voltage VON representing a high level of the gate signal, and may also include a first gate off voltage VSS1 and a second gate off voltage VSS2 representing low levels of the gate signal.

The power voltage generator 600 generates a data driver power voltage AVDD to operate the data driver 500, and the power voltage generator 600 outputs the data driver power voltage AVDD to the data driver 500. The data driver power voltage AVDD may be an analog power voltage provided to an amplifier in the data driver 500.

Figure 2:
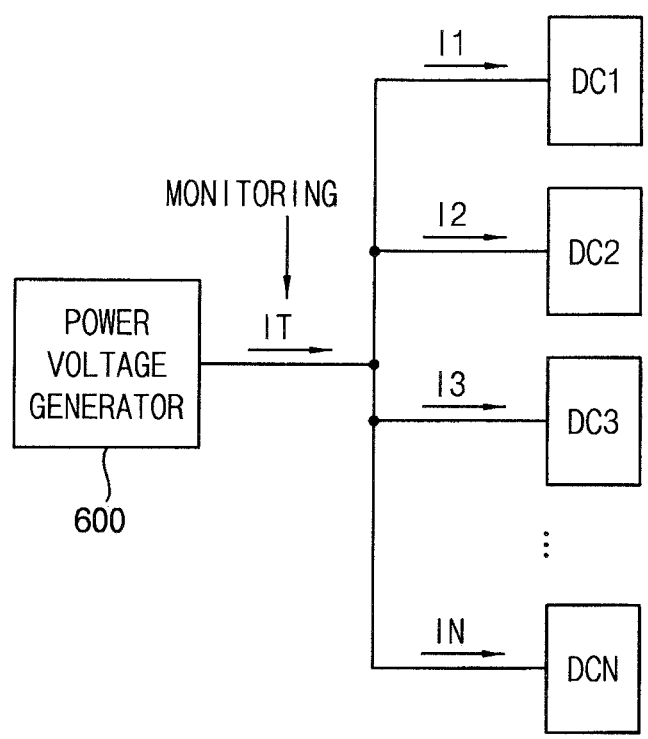
FIG. 2 is a conceptual diagram illustrating a method of sensing a short circuit of a load by a power voltage generator of FIG. 1.
Figure 3A:
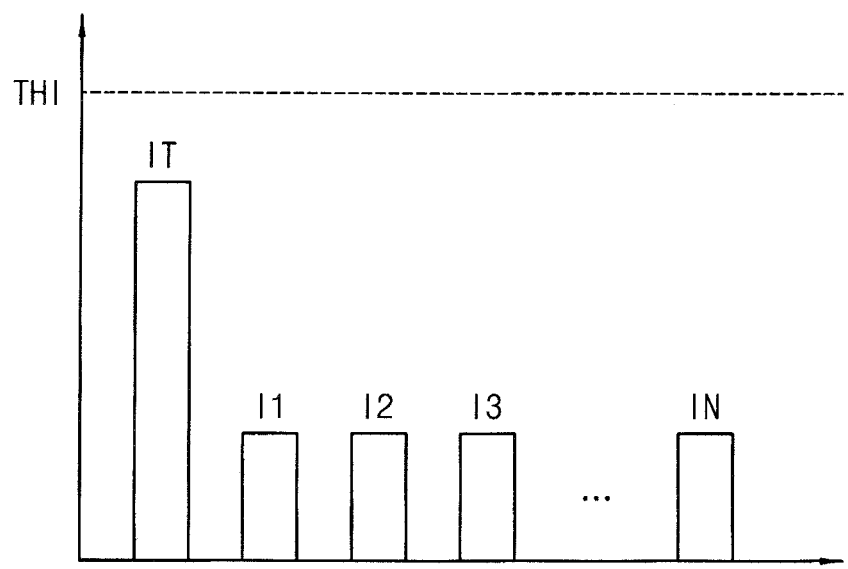
FIGS. 3A and 3B are graphs illustrating aspects of the method of sensing the short circuit of the load by the power voltage generator of FIG. 1.
Figure 3B:
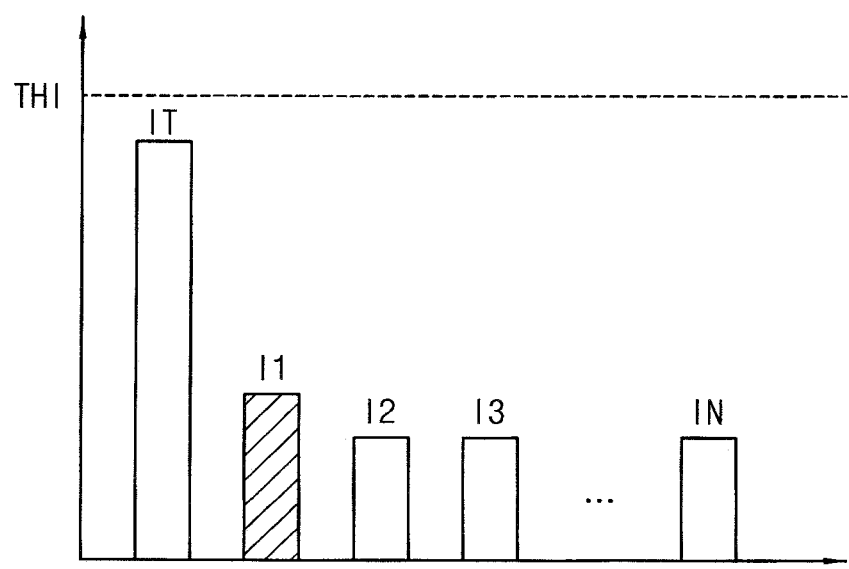

FIG. 2 is a conceptual diagram illustrating a method of sensing a short circuit of a load by the power voltage generator 600 of FIG. 1. FIGS. 3A and 3B are graphs illustrating aspects of the method of sensing the short circuit of the load by the power voltage generator 600 of FIG. 1.

Referring to FIGS. 1 to 3B, the power voltage generator 600 may be connected to a plurality of driving blocks DC1, DC2, DC3, ..., DCN of the data driver 500. The power voltage generator 600 may output the data driver power voltage AVDD to the driving blocks DC1, DC2, DC3, ..., DCN of the data driver 500.

When the short circuit is generated in the data driver 500 or in the display panel 100, the data driver 500 or the display panel 100 may be damaged, and fire or heat may be generated in data driver 500 or in the display panel 100. Thus, when the short circuit is generated in the data driver 500 or in the display panel 100, the power voltage generator 600 should stop providing the data driver power voltage AVDD to the data driver 500.

For example, the short circuit of the data driver 500 may be generated between the power voltage AVDD of the amplifier, which outputs the data voltage, and a ground terminal. In addition, the short circuit of the data driver 500 may be generated between adjacent data pads that output the data voltages from the data driver 500 to the display panel 100.

For example, the short circuit of the display panel 100 may be generated between adjacent data lines.

For example, the power voltage generator 600 may monitor currents I1, I2, I3, ..., IN respectively flowing through the driving blocks DC1, DC2, DC3, ..., DCN, or may monitor a total current IT flowing through the driving blocks DC1, DC2, DC3, ..., DCN, to determine the short circuit in the data driver 500 or in the display panel 100.

In FIG. 3A, when the total current IT flowing through the driving blocks DC1, DC2, DC3, ..., DCN from the power voltage generator 600 is equal to or greater than a threshold current THI, the power voltage generator 600 may determine whether the short circuit of the load is generated.

In FIG. 3B, a weak short circuit may be generated in a first driving circuit DC1 of the driving blocks DC1, DC2, DC3, ..., DCN. When the weak short circuit is generated in the first driving block DC1, the current flowing through the first driving circuit DC1 from the power voltage generator 600 increases, and accordingly the total current IT flowing through the driving blocks DC1, DC2, DC3, ..., DCN from the power voltage generator 600 increases. However, when the short circuit of the first driving circuit DC1 is weak, the total current IT may still fail to exceed the threshold current THI so that the power voltage generator 600 may fail to detect the weak short circuit of the first driving circuit DC1. However, the first driving block DC1 may be abnormally operated or damaged due to the weak short circuit.

Figure 4:
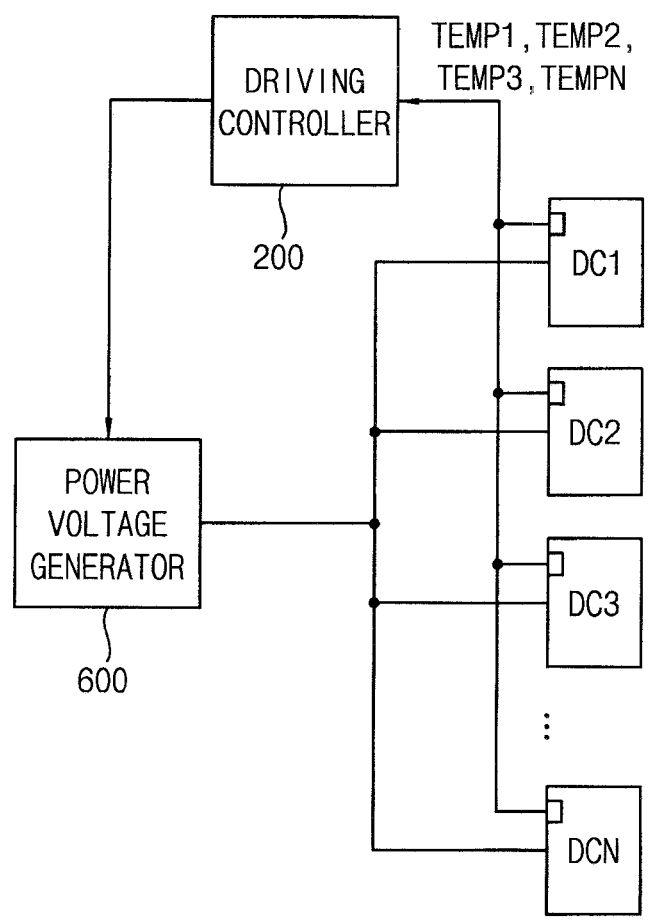
FIG. 4 is a conceptual diagram illustrating aspects of the method of sensing the short circuit of the load by the power voltage generator of FIG. 1.

FIG. 4 is a conceptual diagram illustrating aspects of the method of sensing the short circuit of the load by the power voltage generator 600 of FIG. 1.

Referring to FIGS. 1 to 4, the short circuit in the data driver 500 or in the display panel 100 may be sensed by measuring temperatures of the driving blocks DC1, DC2, DC3, ..., DCN of the data driver 500.

The driving controller 200 receives respective temperature signals TEMP1, TEMP2, TEMP3, ..., TEMPN of the driving blocks DC1, DC2, DC3, ..., DCN from the driving blocks DC1, DC2, DC3, ..., DCN of the data driver 500. When the temperature signals TEMP1, TEMP2, TEMP3, ..., TEMPN exceed a threshold temperature, the driving controller 200 controls the power voltage generator 600 to cease output of the data driver power voltage AVDD to the data driver 500.

The temperatures of the driving blocks DC1, DC2, DC3, ..., DCN slowly increase in a normal operation. However, when the short circuit of the load is generated, the temperatures of the driving blocks DC1, DC2, DC3, ..., DCN may sharply increase so that the control of the power voltage generator 600 using the above explained temperature-sensing method might not be effective, as the driving blocks DC1, DC2, DC3, ..., DCN may be damaged before adequate control of the power voltage generator 600 when the temperatures of the driving blocks DC1, DC2, DC3, ..., DCN sharply increase.

Figure 5:
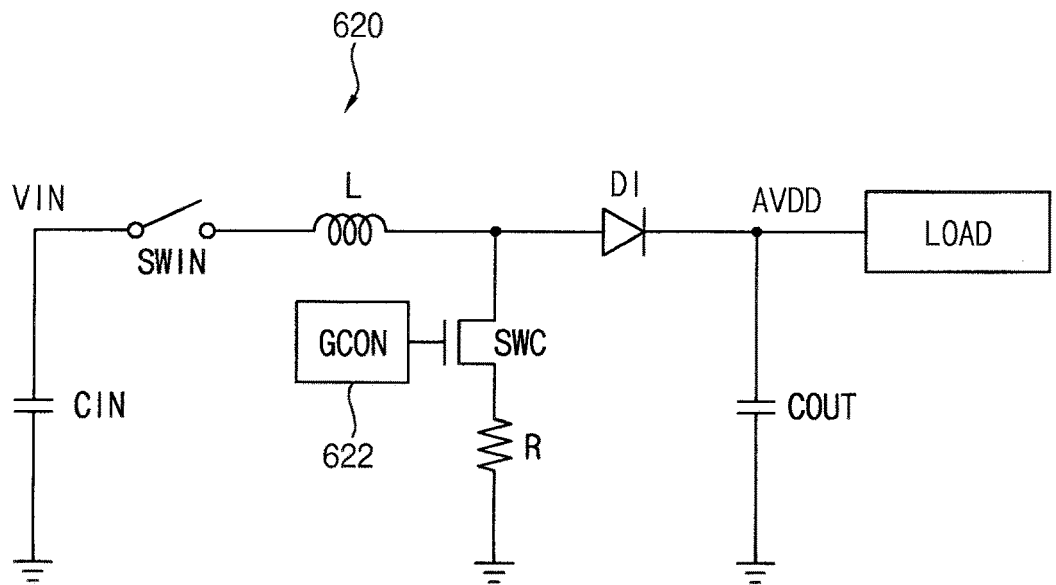
FIG. 5 is a circuit diagram illustrating a data driver power voltage generator of the power voltage generator of FIG. 1.
Figure 6:
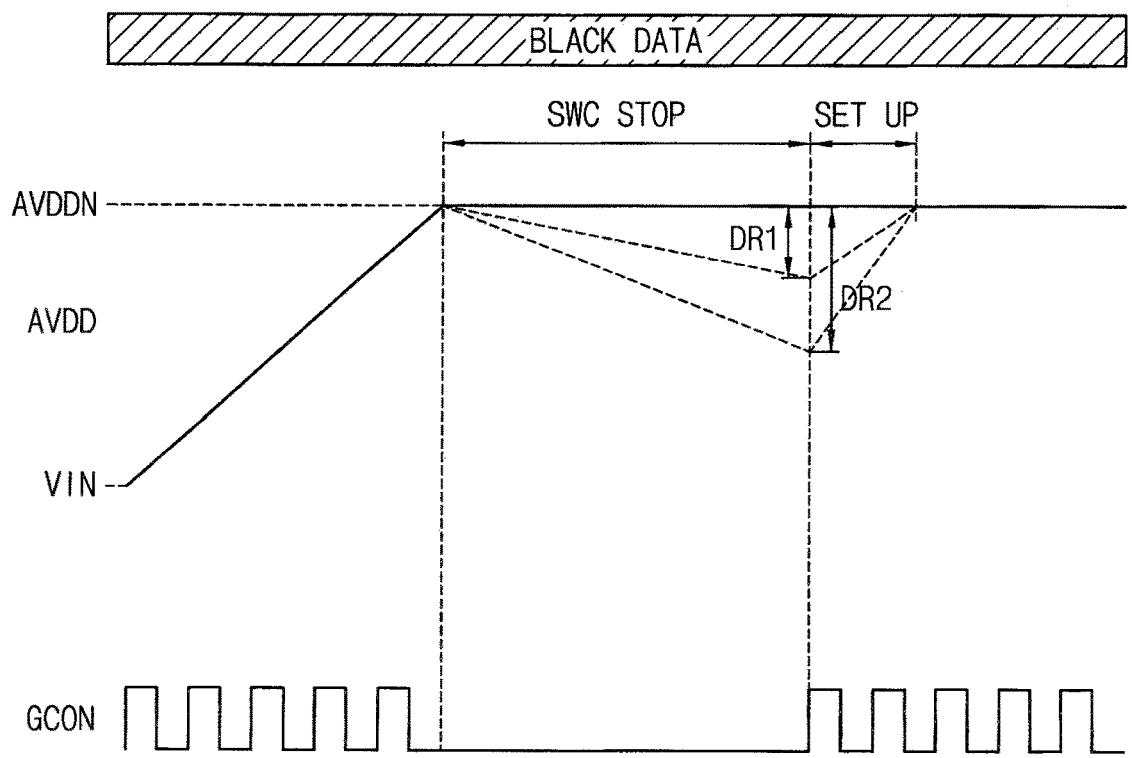
FIG. 6 is a timing diagram illustrating an operation of the data driver power voltage generator of FIG. 5 in an initial driving period.

FIG. 5 is a circuit diagram illustrating a data driver power voltage generator 620 of the power voltage generator 600 of FIG. 1. FIG. 6 is a timing diagram illustrating an operation of the data driver power voltage generator 620 of FIG. 5 in an initial driving period. FIG. 7 is a table illustrating a voltage drop of the data driver power voltage AVDD according to a current of the load of FIG. 5.

Referring to FIGS. 1 and 5 to 7, the power voltage generator 600 includes the data driver power voltage generator 620 for generating the data driver power voltage AVDD.

The data driver power voltage generator 620 may be a DC-to-DC converter. The data driver power voltage generator 620 includes an input capacitor CIN, an inductor L, an input switching element SWIN, a control switching element SWC, a diode DI, and an output capacitor COUT.

The input capacitor CIN includes a first end connected to an input node to which an input voltage VIN is applied and a second end connected to a ground.

The input switching element SWIN is located between the input node and a first end of the inductor L.

The control switching element SWC includes a control electrode connected to a switching controller 622 for applying a switching control signal GCON, an input electrode connected to a resistor R, and an output electrode connected to a second end of the inductor L.

A first end of the resistor R is connected to the input electrode of the control switching element SWC. A second end of the resistor R is connected to the ground.

The diode DI includes a first electrode connected to the second end of the inductor L, and a second electrode connected to an output node.

The output capacitor COUT is connected between the output node and the ground.

When the data driver power voltage generator 620 senses the short circuit of the load connected to the output node in the monitoring period, the data driver power voltage generator 620 turns off the input switching element SWIN.

FIG. 6 represents the signals in the initial driving period of the display apparatus. When the display apparatus is turned on, the input voltage VIN is applied to the input node of the data driver power voltage generator 620. When the input switching element SWIN is turned on, energy of the input voltage VIN is charged in the inductor L.

The switching control signal GCON, which is applied to the switching control switching element SWC, may have a square wave increasing and decreasing between a high level and a low level. According to a duty ratio of the switching control signal GCON, the level of the output voltage AVDD may be determined. The input voltage VIN, the output voltage AVDD, and the duty ratio of the switching control signal GCON may be represented by following Equation 1. Herein, the duty ratio of the switching control signal GCON is DT.

$$AVDD = \left(\frac{1}{1-DT}\right)VIN \qquad \text{Equation 1}$$

When the duty ratio DT of the switching control signal GCON decreases, the level of the output voltage AVDD is decreased. When the duty ratio DT of the switching control signal GCON increases, the level of the output voltage AVDD is increased. Although the duty ratio of the switching control signal GCON is uniformly illustrated for convenience in FIG. 6, the duty ratio of the switching control signal GCON may gradually increase in the initial driving period.

When the control switching element SWC is operated for a suitable time duration by the switching control signal GCON, the level of the output voltage AVDD meets a normal output voltage AVDDN.

In the present embodiment, the level of the switching control signal GCON is maintained in a low level during the monitoring period SWC STOP so that the control switching element SWC may be turned off to sense the short circuit of the load. Voltage drop of the data driver power voltage AVDD outputted to the output node may be measured during the monitoring period SWC STOP.

The monitoring period SWC STOP may be set between a time when the data driver power voltage AVDD meets the normal output voltage AVDDN, and a scan start point of the gate driver 300 in the initial driving period, so that the voltage drop of the data driver power voltage AVDD may be accurately measured.

In FIG. 6, the voltage drop of the data driver power voltage AVDD outputted to the output node during the monitoring period may be, for example, a first value DR1 or a second value DR2.

In FIG. 7, the monitoring period (e.g., a length of the monitoring period) dt, the capacitance C of the output capacitor COUT, and the voltage drop dv of the data driver power voltage AVDD according to the current ic flowing through the load are represented. The monitoring period dt, the capacitance C of the output capacitor COUT, the current ic flowing through the load, and the voltage drop dv of the data driver power voltage AVDD may satisfy following Equation 2.

$$ic = C\frac{dv}{dt} \qquad \text{Equation 2}$$

For example, the monitoring period dt (e.g., SWC STOP in FIG. 6) may be about 1 ms, and the capacitance C of the output capacitor COUT may be about 40 uF (e.g., as shown in FIG. 7). When the monitoring period dt (SWC STOP) is about 1 ms, and when the capacitance C of the output capacitor COUT is about 40 uF, the current ic flowing through the load, and the voltage drop dv of the data driver power voltage AVDD, have the relationship described above and as shown in FIG. 7 as an example.

For example, and referring to FIG. 7, when the voltage drop dv of the data driver power voltage AVDD is about 0.25V, the current of about 10 mA may flow through the load. In addition, when the voltage drop dv of the data driver power voltage AVDD is about 0.5V, the current of about 20 mA may flow through the load. In addition, when the voltage drop dv of the data driver power voltage AVDD is about 1.25V, the current of about 50 mA may flow through the load. In addition, when the voltage drop dv of the data driver power voltage AVDD is about 2.5V, the current of about 100 mA may flow through the load. In addition, when the voltage drop dv of the data driver power voltage AVDD is about 5V, the current of about 200 mA may flow through the load. In addition, when the voltage drop dv of the data driver power voltage AVDD is about 7.5V, the current of about 300 mA may flow through the load.

When the voltage drop dv of the data driver power voltage AVDD during the monitoring period SWC STOP is equal to or greater than a reference voltage drop, the data driver power voltage generator 620 may determine that the short circuit of the load is generated. Thus, when the voltage drop dv of the data driver power voltage AVDD during the monitoring period SWC STOP is equal to or greater than the reference voltage drop, the data driver power voltage generator 620 may turn off the input switching element SWIN to stop the output of the data driver power voltage AVDD to the data driver 500.

For example, when the current flowing through the load is equal to or greater than about 20 mA, the short circuit of the load may be determined. When the voltage drop dv of the data driver power voltage AVDD is equal to or greater than about 0.5V (e.g., in the condition of FIG. 7), the data driver power voltage generator 620 may turn off the input switching element SWIN.

For example, and referring to FIG. 6, the data driver 500 may output a black data voltage BLACK DATA corresponding to a black image to the display panel 100 during the monitoring period SWC STOP. When the data driver 500 outputs the black data voltage BLACK DATA, the load of the data driver 500 may be reduced or minimized so that the short circuit of the load may be accurately detected.

When the monitoring period SWC STOP is terminated, the switching control signal GCON increases and decreases between the high level and the low level, accordingly the data driver power voltage AVDD increases to the normal output voltage AVDDN again in a set up period SET UP.

Figure 8:
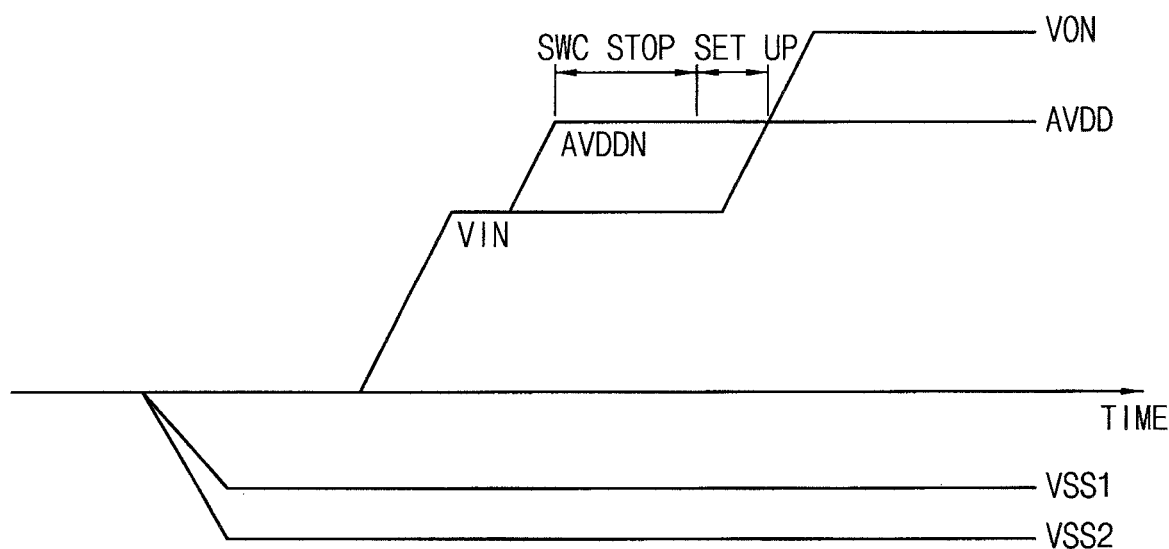
FIG. 8 is a timing diagram illustrating an operation of the power voltage generator of FIG. 1 in the initial driving period.

FIG. 8 is a timing diagram illustrating an operation of the power voltage generator 600 of FIG. 1 in the initial driving period.

Referring to FIGS. 1 and 5 to 8, the power voltage generator 600 generates the gate driver power voltage VON, VSS1, and VSS2, and outputs the gate driver power voltage VON, VSS1, and VSS2 to the gate driver 300 during the initial driving period to operate the gate driver 300. The gate driver power voltage may include the gate on voltage VON representing the high level of the gate signal, and the first gate off voltage VSS1 and the second gate off voltage VSS2 representing the low levels of the gate signal.

The power voltage generator 600 may generate the first gate off voltage VSS1 by decreasing the level of the input voltage VIN. The power voltage generator 600 may generate the second gate off voltage VSS2 by decreasing the level of the input voltage VIN. The second gate off voltage VSS2 may be less than the first gate off voltage VSS1. For example, the first gate off voltage VSS1 and the second gate off voltage VSS2 may be concurrently or substantially simultaneously generated.

The power voltage generator 600 may generate the gate on voltage VON by increasing the level of the input voltage VIN. The gate on voltage VON may be generated by increasing the level of the input voltage VIN in a step shape.

The power voltage generator 600 generates the data driver power voltage AVDD to operate the data driver 500, and outputs the data driver power voltage AVDD to the data driver 500. The data driver power voltage AVDD may be the analog power voltage provided to the amplifier in the data driver 500.

The power voltage generator 600 may generate the data driver power voltage AVDD by increasing the level of the input voltage VIN. The data driver power voltage AVDD may be generated by increasing the level of the input voltage VIN in a step shape.

When the monitoring period SWC STOP and the set up period SET UP are terminated, the gate driver 300 generates the gate signal using the gate on voltage VON, the first gate off voltage VSS1, and the second gate off voltage VSS2, and the data driver 500 generates the data voltage using the data driver power voltage AVDD. The display panel 100 displays an image using the gate signal and the data voltage.

According to the present embodiment, the control switching element SWC of the power voltage generating circuit is turned off during the monitoring period SWC STOP, and the voltage drop of the output voltage is sensed so that the weak short circuit of the load may be sensed.

In addition, the monitoring period SWC STOP may be set between the time when the data driver power voltage AVDD meets the normal output voltage AVDDN, and the scan start point of the gate driver 300 in the initial driving period, so that the short circuit of the load may be accurately sensed, and so that the sensing operation of the short circuit of the load may not negatively affect the display quality of the display panel 100.

In addition, the data driver 500 outputs the black data voltage BLACK DATA corresponding to the black image during the monitoring period SWC STOP so that the short circuit of the load may be accurately sensed.

Figure 9:
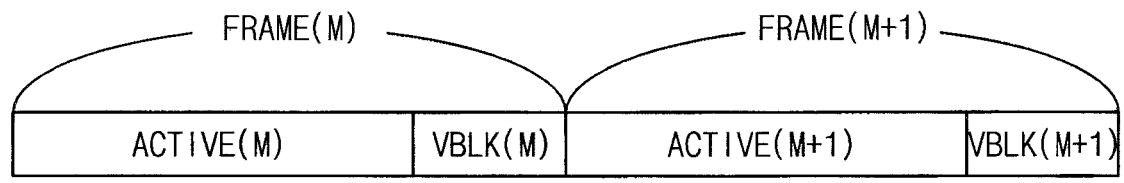
FIG. 9 is a conceptual diagram illustrating a frame of the display panel of FIG. 9.
Figure 10:
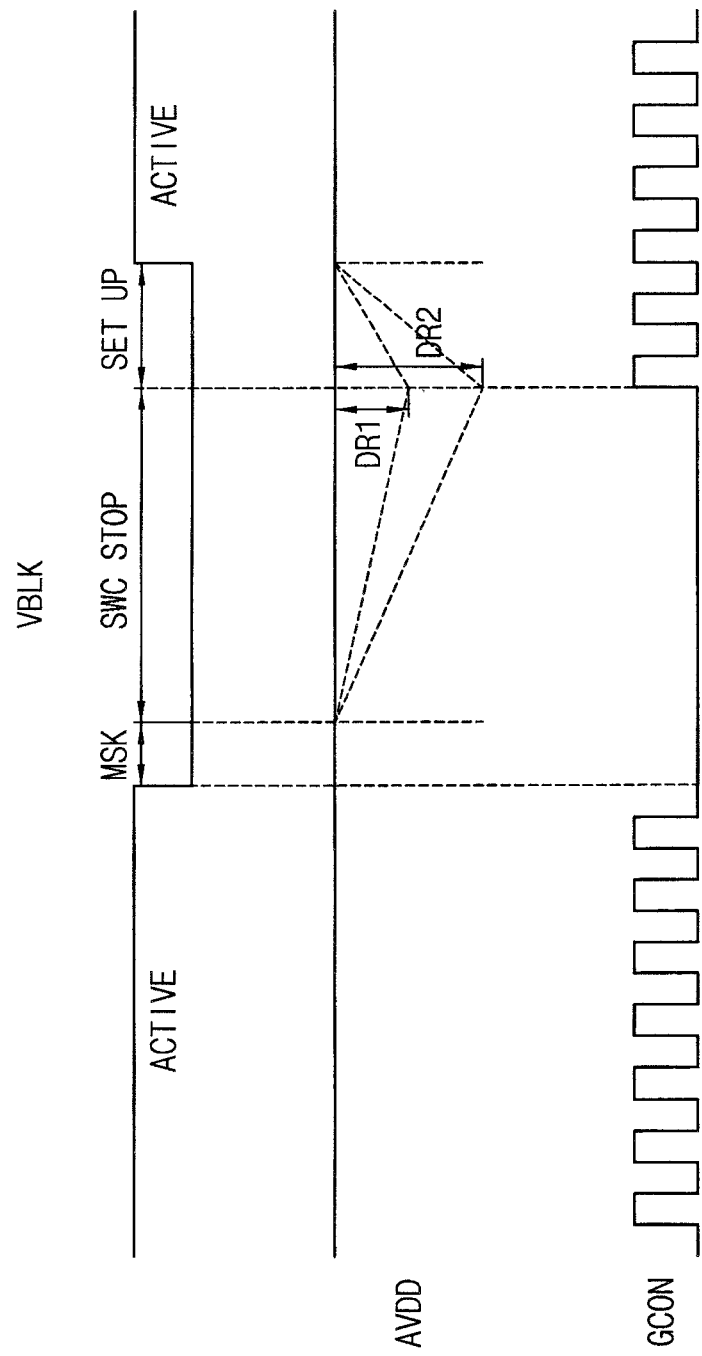
FIG. 10 is a timing diagram illustrating an operation of the data driver power voltage generator of FIG. 5 in a vertical blank period of FIG. 9.

FIG. 9 is a conceptual diagram illustrating a frame of the display panel of FIG. 9. FIG. 10 is a timing diagram illustrating an operation of the data driver power voltage generator of FIG. 5 in a vertical blank period of FIG. 9.

The power voltage generating circuit, the display apparatus, and the method of protecting the data driver according to the embodiments described below are respectively substantially the same as the power voltage generating circuit, the display apparatus, and the method of protecting the data driver of the previous embodiments explained referring to FIGS. 1 to 8 with an exception of the monitoring period. Thus, the same reference numerals will be used to refer to the same or like parts as those described in the previous embodiment of FIGS. 1 to 8, and any repetitive explanation concerning the above elements will be omitted.

Referring to FIGS. 1 and 5 to 10, the display apparatus includes a display panel 100 and a display panel driver. The display panel driver includes the driving controller 200, the gate driver 300, the gamma reference voltage generator 400, the data driver 500, and the power voltage generator 600.

The power voltage generator 600 includes the data driver power voltage generator 620 for generating the data driver power voltage AVDD.

The data driver power voltage generator 620 may be a DC-to-DC converter. The data driver power voltage generator 620 includes the input capacitor CIN, the inductor L, the input switching element SWIN, the control switching element SWC, the diode DI, and the output capacitor COUT.

The display panel 100 displays the image in a unit of a frame. The driving period of the display panel 100 may include an active period ACTIVE when the data voltage is charged to a display area of the display panel 100, and a vertical blank period VBLK when the data voltage is not charged to the display area.

For example, during the active period ACTIVE, the gate signals are sequentially outputted to the gate lines GL located in the display area of the display panel 100, and the data voltages outputted from the data driver 500 are charged to the pixels when the switching elements in the display area are turned on in response to the gate signals so that the image is displayed in the display area.

An M-th frame FRAME(M) may include an active period ACTIVE(M) and a vertical blank period VBLK(M). An (M+1)-th frame FRAME(M+1) subsequent to the M-th frame FRAME(M) may include an active period ACTIVE(M+1) and a vertical blank period VBLK(M+1). Although the frame includes the active period ACTIVE and the vertical blank period VBLK in FIG. 9, the frame may alternatively refer to only the active period ACTIVE.

In the present embodiment, the level of the switching control signal GCON is maintained in a low level during the monitoring period SWC STOP so that the control switching element SWC may be turned off to sense the short circuit of the load. Voltage drop of the data driver power voltage AVDD outputted to the output node may be measured during the monitoring period SWC STOP.

In the present embodiment, the monitoring period SWC STOP may be set in the vertical blank period VBLK.

When the voltage drop dv of the data driver power voltage AVDD during the monitoring period SWC STOP is equal to or greater than a reference voltage drop, the data driver power voltage generator 620 may determine that the short circuit of the load is generated. Thus, when the voltage drop dv of the data driver power voltage AVDD during the monitoring period SWC STOP is equal to or greater than the reference voltage drop, the data driver power voltage generator 620 may turn off the input switching element SWIN to not output the data driver power voltage AVDD to the data driver 500.

In the present embodiment, the short circuit of the load is sensed in the vertical blank period VBLK to protect the data driver 500. When the monitoring period SWC STOP is set in the vertical blank period VBLK, the short circuit of the load is detected during normal operation of the display apparatus, not during the initial driving period.

A hold period MSK may be located right before the monitoring period SWC STOP. During the hold period MSK, the control switching element SWC may repetitively turn on and off. The hold period MSK is located in the vertical blank period VBLK so that the hold period MSK may be distinguished from the active period ACTIVE.

If the monitoring period SWC STOP starts right after the vertical blank period VBLK starts, the short circuit of the load may not be accurately detected due to the remaining load of an end portion of the active period ACTIVE. When the hold period MSK is set before the monitoring period SWC STOP, the short circuit of the load may be more accurately detected.

According to the present embodiment, the control switching element SWC of the power voltage generating circuit is turned off during the monitoring period SWC STOP, and the voltage drop of the output voltage is sensed so that the weak short circuit of the load may be sensed.

In addition, the monitoring period SWC STOP may be set in the vertical blank period VBLK so that the short circuit of the load may be accurately sensed, and so that the sensing operation of the short circuit of the load might not affect the display quality of the display panel 100.

In addition, the holding period MSK may be set prior to the monitoring period SWC STOP so that the short circuit of the load may be accurately sensed.

Figure 11:
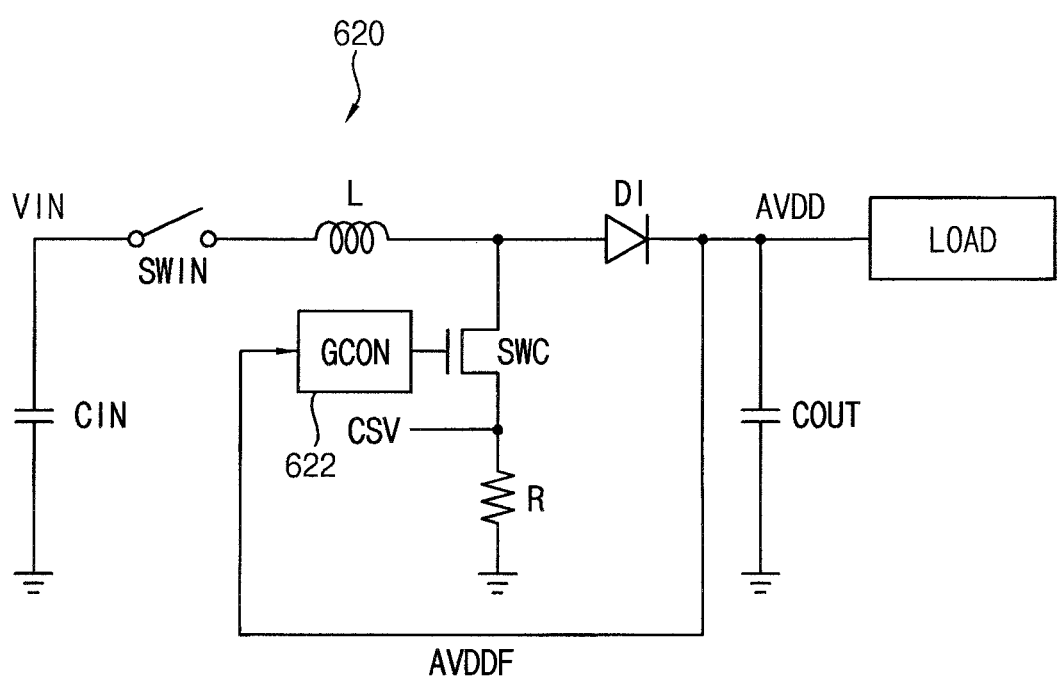
FIG. 11 is a circuit diagram illustrating a data driver power voltage generator of a power voltage generator according to an embodiment of the present inventive concept.

FIG. 11 is a circuit diagram illustrating a data driver power voltage generator 620 of a power voltage generator 600 according to an embodiment of the present inventive concept. FIGS. 12A to 12D are graphs illustrating a switching control signal GCON and a current sensing voltage CSV according to a feedback data driver power voltage AVDDF of FIG. 4. FIG. 13 is a timing diagram illustrating an operation of the power voltage generator 600 of FIG. 11 in the initial driving period.

The power voltage generating circuit, the display apparatus, and the method of protecting the data driver according to the embodiment described below are respectively substantially the same as the power voltage generating circuit, the display apparatus, and the method of protecting the data driver of the previous embodiments explained referring to FIGS. 1 to 8 except for the method of detecting the short circuit of the load. Thus, the same reference numerals will be used to refer to the same or like parts as those described in the previous embodiment of FIGS. 1 to 8, and any repetitive explanation concerning the above elements will be omitted.

Referring to FIGS. 1 and 11 to 13, the display apparatus includes a display panel 100 and a display panel driver. The display panel driver includes the driving controller 200, the gate driver 300, the gamma reference voltage generator 400, the data driver 500, and the power voltage generator 600.

The power voltage generator 600 includes the data driver power voltage generator 620 for generating the data driver power voltage AVDD.

The data driver power voltage generator 620 may be a DC-to-DC converter. The data driver power voltage generator 620 includes the input capacitor CIN, the inductor L, the input switching element SWIN, the control switching element SWC, the diode DI, and the output capacitor COUT.

The input capacitor CIN includes a first end connected to an input node to which an input voltage VIN is applied, and a second end connected to a ground.

The input switching element SWIN is located between the input node and a first end of the inductor L.

The control switching element SWC includes a control electrode connected to a switching controller 622 for applying a switching control signal GCON, an input electrode connected to a resistor R, and an output electrode connected to a second end of the inductor L.

A first end of the resistor R is connected to the input electrode of the control switching element SWC. A second end of the resistor R is connected to the ground.

The diode DI includes a first electrode connected to the second end of the inductor L and a second electrode connected to an output node.

The output capacitor COUT is connected between the output node and the ground.

When the data driver power voltage generator 620 senses the short circuit of the load connected to the output node in the monitoring period, the data driver power voltage generator 620 turns off the input switching element SWIN.

In the present embodiment, the switching controller 622 may receive the data driver power voltage AVDD of the output node, and may adjust a frequency of the switching control signal GCON to adjust the level of the data driver power voltage AVDD according to the feedback data driver power voltage AVDDF.

The switching controller 622 may count the number of events that a current sensing voltage CSV of the input electrode of the control switching element SWC is equal to or greater than a threshold voltage THV during a monitoring period MON (see FIGS. 12A-12D). The current sensing voltage CSV corresponds to the current flowing through the load. Sensing the current sensing voltage CSV may be substantially the same as, or may achieve the same effect as, sensing the current flowing through the load.

When the number of the events in which the current sensing voltage CSV is equal to or greater than the threshold voltage THV is equal to or greater than a reference count, the data driver power voltage generator 620 may turn off the input switching element SWIN. In the present embodiment, for example, the reference count for turning off the input switching element SWIN may be ten.

Figure 12A:
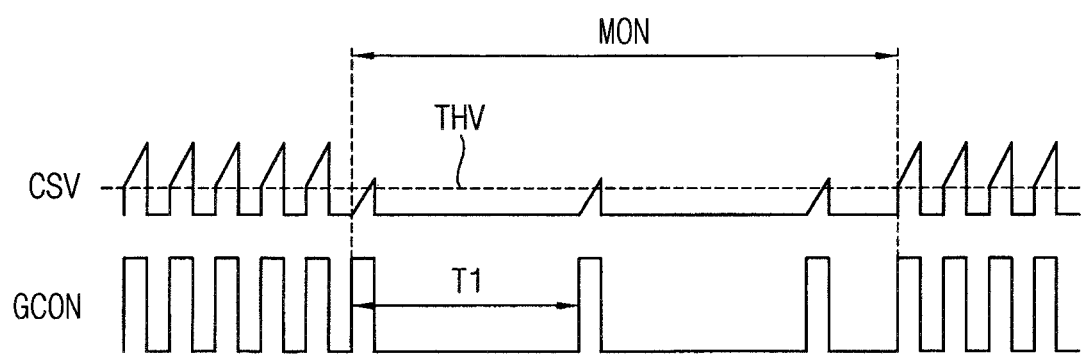
FIGS. 12A to 12D are graphs illustrating a switching control signal and a current sensing voltage according to a feedback data driver power voltage of FIG. 4.
Figure 13:
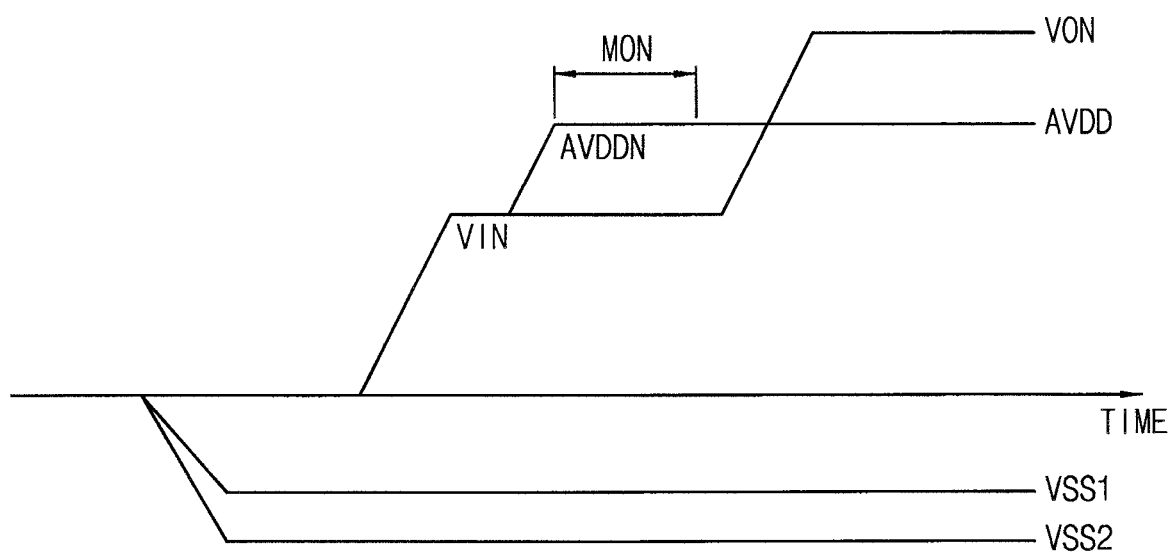
FIG. 13 is a timing diagram illustrating an operation of a power voltage generator of FIG. 11 in the initial driving period.

In FIG. 12A, the number of the events in which the current sensing voltage CSV is equal to or greater than the threshold voltage THV is three due to the pulse skipping driving in the monitoring period MON. A cycle of the switching control signal GCON corresponding to the current sensing voltage CSV is a first cycle T1. The number of the events that the current sensing voltage CSV is equal to or greater than the threshold voltage THV is less than ten, which is the reference count, so it is determined that the short circuit of the load is not generated.

Figure 12B:
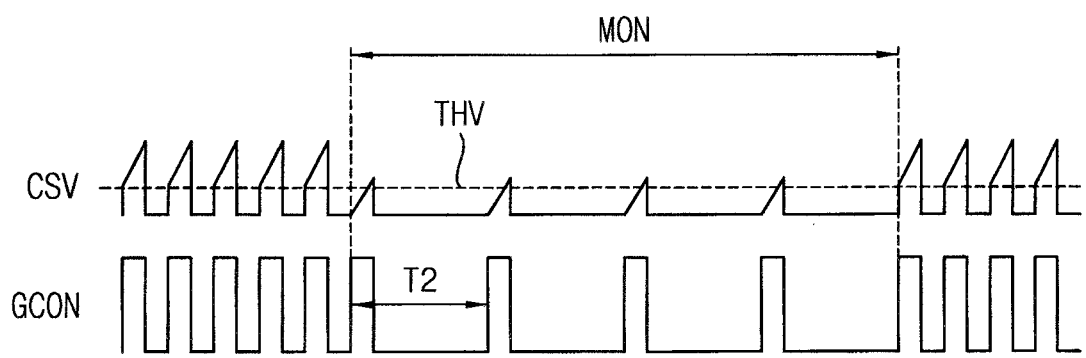

In FIG. 12B, the number of the events in which the current sensing voltage CSV is equal to or greater than the threshold voltage THV is four due to the pulse skipping driving during the monitoring period MON. A cycle of the switching control signal GCON corresponding to the current sensing voltage CSV is a second cycle T2, which is less than the first cycle T1. The load of the data driver 500 corresponding to FIG. 12B may be increased when compared to the load of the data driver in FIG. 12A. The number of the events that the current sensing voltage CSV is equal to or greater than the threshold voltage THV is still less than ten, which is the reference count, so it is determined that the short circuit of the load is not generated.

Figure 12C:
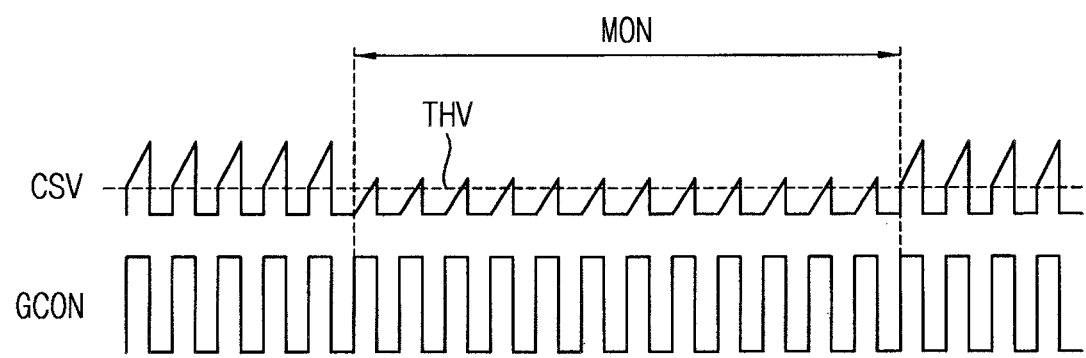

In FIG. 12C, the pulse skipping driving is not applied, and the number of events during the monitoring period MON in which the current sensing voltage CSV is equal to or greater than the threshold voltage THV is twelve. The load of the data driver 500 in FIG. 12C may be greater than the load of the data driver in FIG. 12B. The number of events in which the current sensing voltage CSV is equal to or greater than the threshold voltage THV is equal to or greater than ten, which is the reference count, so it is determined that the short circuit of the load is generated. Accordingly, the data driver power voltage generator 620 may turn off the input switching element SWIN.

Figure 12D:
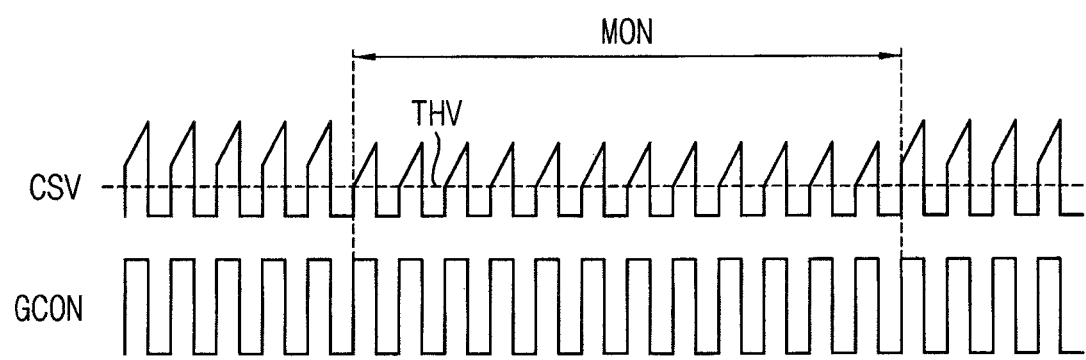

In FIG. 12D, pulse skipping driving is not applied, and the number of events in which the current sensing voltage CSV is equal to or greater than the threshold voltage THV is twelve during the monitoring period MON. The load of the data driver 500 in FIG. 12D may be greater than the load of the data driver in FIG. 12C so that the level of the current sensing voltage CSV in FIG. 12D is greater than the level of the current sensing voltage CSV in FIG. 12C. The number of the events in which the current sensing voltage CSV is equal to or greater than the threshold voltage THV is equal to or greater than ten, which is the reference count, such that it is determined that a short circuit of the load is generated, and such that the data driver power voltage generator 620 may turn off the input switching element SWIN.

In the present embodiment, the monitoring period MON may be set between a time when the data driver power voltage AVDD meets the normal output voltage AVDDN, and a time corresponding to a scan start point of the gate driver 300 in the initial driving period.

During the initial driving period, the data driver 500 outputs the black data voltage to the display panel 100. During the initial driving period, the load of the data driver 500 is little, so that the data driver power voltage generator 620 decreases the frequency of the switching control signal GCON using the pulse skipping method when the load is in a normal range. In contrast, the data driver power voltage generator 620 gradually increases the frequency of the switching control signal GCON to gradually increase the level of the data driver power voltage AVDD when the short circuit of the load is generated.

According to the present embodiment, the signal of the control switching element of the power voltage generating circuit is sensed during the monitoring period MON so that a weak short circuit of the load may be sensed.

In addition, the monitoring period MON may be set between the time when the data driver power voltage AVDD meets the normal output voltage AVDDN, and the time of the scan start point of the gate driver 300 in the initial driving period, such that the short circuit of the load may be accurately sensed, and such that the sensing operation of the short circuit of the load need not negatively affect the display quality of the display panel 100.

In addition, the data driver 500 outputs the black data voltage BLACK DATA corresponding to the black image during the monitoring period MON so that the short circuit of the load may be accurately sensed.

Figure 14:
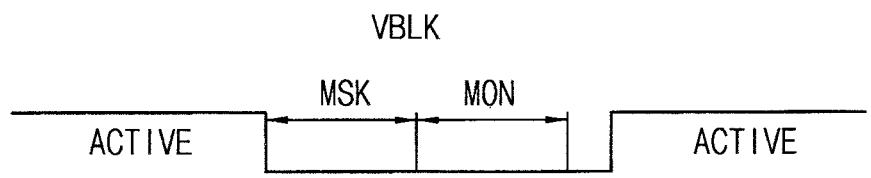
FIG. 14 is a timing diagram illustrating an operation of the data driver power voltage generator of FIG. 11 in a vertical blank period.

FIG. 14 is a timing diagram illustrating an operation of the data driver power voltage generator of FIG. 11 in a vertical blank period.

The power voltage generating circuit, the display apparatus, and the method of protecting the data driver according to the embodiments described below are respectively substantially the same as the power voltage generating circuit, the display apparatus, and the method of protecting the data driver of the previous embodiments explained referring to FIGS. 11 to 13, except for the monitoring period. Thus, the same reference numerals will be used to refer to the same or like parts as those described in the previous embodiment of FIGS. 11 to 13, and any repetitive explanation concerning the above elements will be omitted.

Referring to FIGS. 1, 11, 12A to 12D, and 14, the display apparatus includes a display panel 100 and a display panel driver. The display panel driver includes the driving controller 200, the gate driver 300, the gamma reference voltage generator 400, the data driver 500, and the power voltage generator 600.

The power voltage generator 600 includes the data driver power voltage generator 620 for generating the data driver power voltage AVDD.

The data driver power voltage generator 620 may be a DC-to-DC converter. The data driver power voltage generator 620 includes the input capacitor CIN, the inductor L, the input switching element SWIN, the control switching element SWC, the diode DI, and the output capacitor COUT.

The display panel 100 displays the image in units of frames. The driving period of the display panel 100 may include an active period ACTIVE when the data voltage is charged to a display area of the display panel 100, and a vertical blank period VBLK when the data voltage is not charged to the display area.

For example, during the active period ACTIVE, the gate signals are sequentially outputted to the gate lines GL located in the display area of the display panel 100, and the data voltages outputted from the data driver 500 are charged to the pixels when the switching elements in the display area are turned on in response to the gate signals so that the image is displayed in the display area.

In the present embodiment, the switching controller 622 may receive the data driver power voltage AVDD of the output node, and may adjust a frequency of the switching control signal GCON to adjust the level of the data driver power voltage AVDD according to the feedback data driver power voltage AVDDF.

The switching controller 622 may count the number of events in which a current sensing voltage CSV of the input electrode of the control switching element SWC is equal to or greater than a threshold voltage THV during a monitoring period MON. The current sensing voltage CSV corresponds to the current flowing through the load. Sensing the current sensing voltage CSV may have substantially the same effect as sensing the current flowing through the load.

When the number of occurrences in which the current sensing voltage CSV is equal to or greater than the threshold voltage THV is equal to or greater than a reference count, the data driver power voltage generator 620 may turn off the input switching element SWIN.

In the present embodiment, the monitoring period MON may be set in the vertical blank period VBLK.

During the vertical blank period VBLK, the load of the data driver 500 is relatively very little so that the data driver power voltage generator 620 decreases the frequency of the switching control signal GCON using the pulse skipping method when the load is in a normal range. In contrast, the data driver power voltage generator 620 gradually increases the frequency of the switching control signal GCON to gradually increase the level of the data driver power voltage AVDD when the short circuit of the load is generated.

A hold period MSK may be located right before the monitoring period MON. During the hold period MSK, the switching controller 622 may not count events in which a current sensing voltage CSV of the input electrode of the control switching element SWC is equal to or greater than a threshold voltage THV. The hold period MSK may be located in the vertical blank period VBLK.

If the monitoring period MON starts right after the vertical blank period VBLK starts, the short circuit of the load may not be accurately detected due to the remaining load of an end portion of the active period ACTIVE. When the hold period MSK is set before the monitoring period MON, the short circuit of the load may be more accurately detected.

In the present embodiment, the monitoring periods MON may be located in respective frames. The switching controller 622 may count the number of events in which the current sensing voltage CSV is equal to or greater than a threshold voltage THV in a single frame. When the number of events that the current sensing voltage CSV is equal to or greater than the threshold voltage THV in a single frame, the frame may be determined as an abnormal frame.

In addition, when the number of the abnormal frames is equal to or greater than a reference number of frames, the input switching element SWIN may be turned off.

According to the present embodiment, the signal of the control switching element of the power voltage generating circuit is sensed during the monitoring period MON so that the weak short circuit of the load may be sensed.

In addition, the monitoring period MON may be set in the vertical blank period VBLK so that the short circuit of the load may be accurately sensed, and so that the sensing operation of the short circuit of the load does not adversely affect the display quality of the display panel 100.

In addition, the holding period MSK may be set prior to the monitoring period MON so that the short circuit of the load may be accurately sensed.

According to the present inventive concept as explained above, the weak short circuit of the load is detected so that the display panel driver and the display panel may be protected from damage, and so that an accident of the product such as fire may be prevented.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A display apparatus comprising:
   a display panel configured to display an image;
   a gate driver configured to output a gate signal to the display panel;
   a data driver configured to output a data voltage to the display panel; and
   a power voltage generator configured to provide a gate driver power voltage to the gate driver, configured to provide a data driver power voltage to the data driver, and comprising a data driver power voltage generator that is configured to generate the data driver power voltage, the data driver power voltage generator comprising:
   an input capacitor comprising a first end connected to an input node and a second end connected to a ground;
   an inductor;
   an input switching element comprising a switch having a first end connected to the input node and a second end connected to a first end of the inductor;
   a control switching element comprising a control electrode connected to a switching controller that is configured to apply a switching control signal, an input electrode connected to a resistor, and an output electrode connected to a second end of the inductor;
   a diode comprising a first electrode connected to the second end of the inductor, and a second electrode connected to an output node; and
   an output capacitor connected between the output node and the ground,
   wherein the data driver power voltage generator is configured to turn off the input switching element to electrically disconnect the input node from the first end of the inductor when a short circuit of a load connected to the output node is detected in a monitoring period.

2. The display apparatus of claim 1, wherein the control switching element is configured to be turned off, and voltage drop of the data driver power voltage outputted from the output node is configured to be measured, in the monitoring period, and
   wherein the input switching element is configured to be turned off when the voltage drop of the data driver power voltage is equal to or greater than a reference voltage drop.

3. The display apparatus of claim 2, wherein the display panel is configured to display the image in units of frames,
   wherein each of the frames comprises an active period and a vertical blank period, and
   wherein the monitoring period is in the vertical blank period.

4. The display apparatus of claim 3, wherein a hold period occurs before the monitoring period,
   wherein the control switching element is configured to repetitively turn on and off during the hold period, and
   wherein the hold period is in the vertical blank period.

5. The display apparatus of claim 2, wherein the data driver is configured to output a black data voltage corresponding to a black image to the display panel during the monitoring period.

6. The display apparatus of claim 1, wherein the switching controller is configured to receive a feedback data driver power voltage of the output node, and is configured to adjust a frequency of the switching control signal to adjust a level of the data driver power voltage according to the feedback data driver power voltage.

7. A display apparatus comprising:
   a display panel configured to display an image;
   a gate driver configured to output a gate signal to the display panel;
   a data driver configured to output a data voltage to the display panel; and
   a power voltage generator configured to provide a gate driver power voltage to the gate driver, configured to provide a data driver power voltage to the data driver, and comprising a data driver power voltage generator that is configured to generate the data driver power voltage, the data driver power voltage generator comprising:
- an input capacitor comprising a first end connected to an input node and a second end connected to a ground;
- an inductor;
- an input switching element connected the input node and a first end of the inductor;
- a control switching element comprising a control electrode connected to a switching controller that is configured to apply a switching control signal, an input electrode connected to a resistor, and an output electrode connected to a second end of the inductor;
- a diode comprising a first electrode connected to the second end of the inductor, and a second electrode connected to an output node; and
- an output capacitor connected between the output node and the ground, wherein the data driver power voltage generator is configured to turn off the input switching element when a short circuit of a load connected to the output node is detected in a monitoring period, wherein the control switching element is configured to be turned off, and voltage drop of the data driver power voltage outputted from the output node is configured to be measured, in the monitoring period, wherein the input switching element is configured to be turned off when the voltage drop of the data driver power voltage is equal to or greater than a reference voltage drop, and wherein the monitoring period is between a time when the data driver power voltage meets a normal output voltage and a scan start point of the gate driver in an initial driving period of the display apparatus.

8. A display apparatus comprising:
a display panel configured to display an image;
a gate driver configured to output a gate signal to the display panel;
a data driver configured to output a data voltage to the display panel; and
a power voltage generator configured to provide a gate driver power voltage to the gate driver, configured to provide a data driver power voltage to the data driver, and comprising a data driver power voltage generator that is configured to generate the data driver power voltage, the data driver power voltage generator comprising:
- an input capacitor comprising a first end connected to an input node and a second end connected to a ground;
- an inductor;
- an input switching element connected the input node and a first end of the inductor;
- a control switching element comprising a control electrode connected to a switching controller that is configured to apply a switching control signal, an input electrode connected to a resistor, and an output electrode connected to a second end of the inductor;
- a diode comprising a first electrode connected to the second end of the inductor, and a second electrode connected to an output node; and
- an output capacitor connected between the output node and the ground, wherein the data driver power voltage generator is configured to turn off the input switching element when a short circuit of a load connected to the output node is detected in a monitoring period, wherein the switching controller is configured to receive a feedback data driver power voltage of the output node, and is configured to adjust a frequency of the switching control signal to adjust a level of the data driver power voltage according to the feedback data driver power voltage, wherein the switching controller is configured to count a number of events in which a current sensing voltage of the input electrode of the control switching element is equal to or greater than a threshold voltage during the monitoring period, and wherein the input switching element is configured to be turned off when the number of events is equal to or greater than a reference count.

9. The display apparatus of claim 8, wherein the monitoring period is between a time when the data driver power voltage meets a normal output voltage and a scan start point of the gate driver in an initial driving period of the display apparatus.

10. The display apparatus of claim 8, wherein the display panel is configured to display the image in units of frames,
wherein each of the frames comprises an active period and a vertical blank period, and
wherein the monitoring period is set in the vertical blank period.

11. The display apparatus of claim 10, wherein a hold period occurs before the monitoring period,
wherein the switching controller does not count the number of events during the hold period, and
wherein the hold period is in the vertical blank period.

12. The display apparatus of claim 10, wherein respective monitoring periods are respectively set in a plurality of frames,
wherein the switching controller is configured to count the number of events during the monitoring period in a single frame of the frames,
wherein each of the frames is determined as an abnormal frame when the number of events is equal to or greater than the reference count, and
wherein the input switching element is configured to be turned off when a number of abnormal frames is equal to or greater than a reference number of frames.

* * * * *